June 14, 1949.
H. J. PAYNTER
2,472,848
METHOD OF ELECTRIC BUTT WELDING
METALLIC CONTAINER SEAMS
Filed Jan. 23, 1946
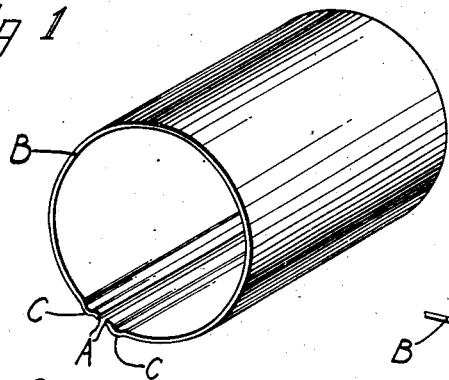
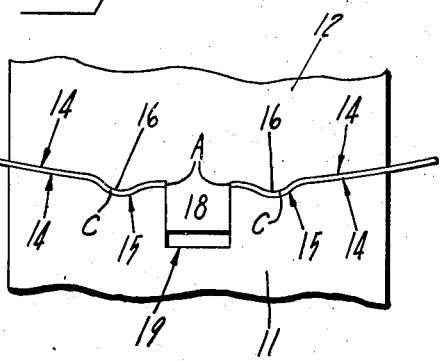
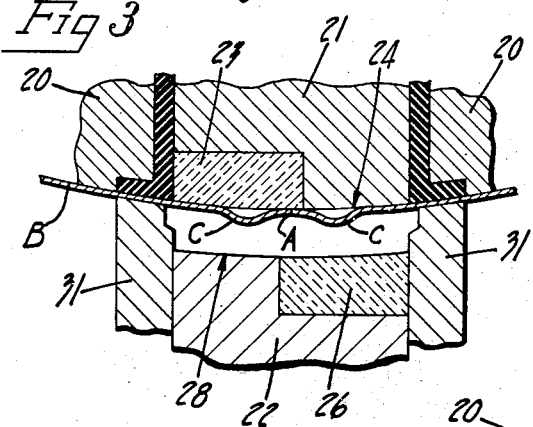
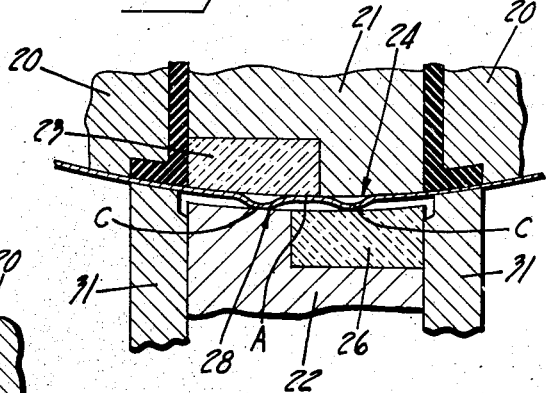
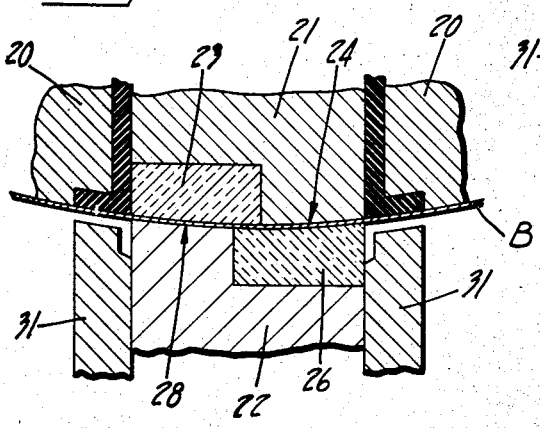
INVENTOR.
Horace J. Paynter
BY
Ivan D. Thornburgh
Charles H. Erne
ATTORNEY Patented June 14, 1949

2,472,848

UNITED STATES PATENT OFFICE 2,472,848

METHOD OF ELECTRIC BUTT-WELDING METALLIC CONTAINER SEAMS

Horace J. Paynter, Union, N. J., assignor to American Can Company, New York, N. Y., a corporation of New Jersey Application January 23, 1946, Serial No. 642,930

6 Claims. (Cl. 219—10)

The present invention relates to a method of electric butt-welding of complementary edges of metallic sheet material, such as side seam edges of container or can bodies, and has particular reference to a novel manner of bringing the full length of the side seam edges together under high pressure for the welding operation for simultaneously welding the seam in its entirety. Apparatus whereby this method may be effected is disclosed in my copending application, Serial No. 642,931, filed January 23, 1946, for Apparatus for welding container seams.

An object of the invention is the provision of a method of electric butt-welding the full length simultaneously of complementary edges of metallic sheet material wherein the material adjacent the edges to be welded is pre-formed in such a manner that pressure applied against the pre-formed material in a lateral direction creates and exerts a resultant pressure transversely of the edges to firmly press these edges together for the welding operation thereby producing an improved welded seam.

Another object is the provision of such a method of butt-welding complementary edges of thin metallic sheet material wherein the pre-formed material adjacent the edges to be welded is reformed as an incident to the welding operation to provide an improved smooth welded joint.

Another object is the provision of such a method of butt-welded edges of sheet material wherein extrusion of the material at the seam is prevented so that the surfaces of the welded seam will be flush with the surfaces of the sheet material.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a sheet metal can body prior to having its side seam edges joined in a butt-welded seam in accordance with the steps of the instant method invention;

Fig. 2 is an enlarged end view of the side seam edge portions of the can body shown in Fig. 1 showing the same in place in a forming device and illustrating the step of pre-forming the material of the body adjacent its seam edges, with parts broken away; and Figs. 3, 4 and 5 are enlarged sectional views of apparatus for pressing and welding the side seam edges of the body together and illustrating the seam edges in different stages of the pressing and welding operation.

As a preferred embodiment of the instant method invention the drawings illustrate the various steps of electric butt-welding the full length simultaneously of complementary side seam edges A of a tubular sheet metal can body B (Fig. 1). In accordance with these method steps the material of the body adjacent and longitudinally of the side seam edges, is first pre-formed, as by the creation of curved corrugations C parallel with and along each edge A for its full length, as shown in Figs. 1 and 2. These two corrugations stiffen the edges of the body and arrange the edges in parallel and lateral alignment so that they will more readily come into abutting relation when pressed together.

With the marginal portions of the body adjacent its edges A thus pre-formed the edges are brought together in abutting engagement as shown in Fig. 3. To temporarily hold the edges against separation, the body adjacent its pre-formed marginal portions C is clamped against displacement. While the body is thus held in place lateral pressure from opposed directions is exerted against the curved corrugations.

During this step, the applied pressure on the corrugations C preferably is progressively increased. This increasing pressure tends to flatten out the corrugations and thus presses the abutting edges A of the body together edgewise, that is, in a direction transversely of the seam, under the progressively increasing high pressure. This lateral pressure on the corrugations and the transverse pressure on the seam edges continues until the corrugations are entirely flattened out, as shown in Fig. 5. Thus the material of the body adjacent its edges is re-formed and is restored into a smooth even surface.

In synchronism with this lateral application of pressure to the corrugations C an electric welding current is passed into the can body adjacent one edge A and travels across the abutting edges and then out by way of the can body adjacent its opposed edge A. This application of the welding current preferably is effected after the corrugations C have been flattened out and while the seam edges are maintained under the high transverse pressure mentioned above, although the invention is equally well adapted to the application of welded current simultaneously with the re-forming of the corrugations C, if such is desired. This flow of welding current heats the abutting edges A to a welding temperature by resistance and thus fuses or reduces the edges to a molten condition while the high transverse pressure on these fused edges, brought about by the flattening of the corrugations C, completely unites them in a greatly improved welded seam.

Pre-forming of the marginal edge portions of the can body B adjacent its side seam edges A, to provide the longitudinal corrugations C may be effected in any suitable manner. Principal parts of one form of apparatus for shaping these corrugations is shown in Fig. 2 and comprises a stationary lower die element 11 and a cooperating movable upper die element 12 which may be parts of a more elaborate mechanism. The inner faces of each of these die elements are formed with curved surfaces 14 to accommodate the contour of the can body B.

Adjacent these curved surfaces the lower die element is formed with a pair of spaced and parallel curved grooves 15 and the upper die element is provided with cooperating curved beading projections 16. These cooperating parts form the corrugations C. Intermediate the projections 16 the upper die element 12 is formed with a depending edge locating lug 18. This lug operates in a recess 19 formed in the lower die element 11.

A can body B to be provided with the corrugations C is placed in the forming apparatus with its side seam edge portions disposed between the lower and upper die elements 11, 12 and with its side seam edges A spaced apart and in engagement with the opposing sides of the locating lug 18 of the upper element.

While in this position the lower element 11 is moved up against the can body and thus squeezes the body edge portions between the two die elements as shown in Fig. 2. It is this squeezing action that forms the corrugations C in the can body, the corrugations being formed longitudinally of and parallel with the side seam edges A and in a predetermined spaced relation from these edges. As shown in the drawings, the corrugations preferably are formed outwardly of the body while leaving the edges A in line with the curved contour of the inside surface of the body although the invention is equally well adapted to inwardly projecting corrugations or to more than one pair of corrugations if these modifications are desirable.

Welding of the preformed side seam edges A preferably is brought about in a form of apparatus the principal parts of which are disclosed in Fig. 3. This apparatus includes a mandrel 20 on which the can body is supported and a pair of oppositely disposed upper and lower bar welding electrodes 21, 22. These electrodes are slightly longer than the can body to be welded. The side seam edge portions of the body are placed between the electrodes for the welding operation. These electrodes are connected in any suitable manner to a source of electric welding current controlled by suitable switch means. It will be noted that the inner contacting surfaces of the electrodes are curved to correspond to the contour of the can body.

The upper electrode 21 preferably is stationary and may be disposed in and insulated from the mandrel 20 which supports the can body during the welding operation. A hard ceramic insulating block 23 is located in the outer face of the upper electrode 21 adjacent one edge (at the left as viewed in Fig. 3). Such a block extends along this face for slightly more than one half its width. This block reduces the current transmitting portion of the electrode to slightly less than one half its width, and thus provides a narrow electrode surface 24 (at the right as viewed in Fig. 3) adjacent the insulating block.

The lower electrode 22 preferably is movable toward and away from the upper stationary electrode 21 and may be actuated through an up or welding stroke and thence through a down or return stroke in any suitable manner. This movable electrode is similar in construction to the stationary electrode 21. A hard ceramic insulating block 26 is disposed in the inner surface of the electrode 22 adjacent a corner (at the right as viewed in Fig. 3) diagonally opposite to the block 23 in the upper electrode 21.

The inner surface of insulating block 26 extends along the outer face of the electrode for slightly more than one half its width and thus slightly overlaps the block 23 in the upper electrode, as best shown in Fig. 3. This block reduces the current transmitting portion of the lower electrode in the same manner as in the upper electrode and thus provides a narrow electrode surface 28 in this electrode.

The diagonally opposite and slightly overlapping positions of the insulating blocks 23, 26 in the two electrodes thus set off the current transmitting surfaces 24, 28 of the electrodes in a diagonally disposed and transversely separated relation. With this spaced relation of the current transmitting surfaces of the electrodes, the passage of current directly from one electrode to the other is prevented. Current can only be passed when both electrodes contact the can body and then only through the body across the seam to be welded.

With the can body B on the mandrel 20 with the side seam edge portions of the body between the electrodes, the edges A are brought into contacting engagement in any suitable manner, as shown in Fig. 3. While in this position the edge portions of the body are temporarily clamped against the mandrel to keep the edges A in engagement. This clamping of the body is brought about by a pair of vertically movable clamp members 31 which are disposed one on each side of the lower electrode 22. These clamp members extend longitudinally of the mandrel for the full length of the can body. They are moved upwardly through a clamping stroke and thence downwardly through a return stroke in any suitable manner in time with the movement of the lower electrode.

While the clamp members 31 hold the engaged edges A of the body in contacting position, the lower electrode moves up through its welding stroke and comes into contact with and then presses against the corrugations C, as shown in Fig. 4. This exerts a lateral pressure on the body which is backed up by the upper electrode 21. This pressing action tends to flatten out the corrugations and thereupon there is created an edgewise or transverse movement of the body edges A toward each other. It is this transverse pressing together of the edges with considerable force that is very effective for a good weld.

As the lower electrode 22 continues to move up the transverse or edgewise pressure on the abutting edges A progressively increases. This upward movement of the electrode and the progressive increasing of these pressures continue until the corrugations C are entirely flattened out and the marginal edge portions of the body are reformed to provide a smooth even surface for the body adjacent the side seam, as shown in Fig. 5.

The lower electrode at the peak of its upward travel is pressing the can body seam edges A against the upper electrode 21 with maximum force. At the same time the edges in the side seam are being forced together under a high pressure due to flattening of the corrugation. Thus the surrounding air is excluded from the seam and hence oxidation of the metal is prevented during the welding operation.

When the lower electrode 22 reaches the peak of its upward travel it holds the flattened or reformed edge portions of the body against displacement and the clamping members 31 are then lowered through their return stroke, thus moving away from the can body. This releases the temporary holding or clamping of the body and permits the body to be held in place by the lower electrode alone. This removal of the clamping members 31 is effected to prevent short circuiting of the electric welding current. Where the clamping members are made of insulating material their removal from the body may be delayed until after the welding operation.

As soon as the clamping members 31 are out of the way, the electric welding current is turned on and flows through the electrodes, passing through the can body edge portions and across the seam. The resulting heating and fusing of the body edges while they are under the high pressure mentioned above completely unites them in a greatly improved strongly welded joint for the body.

At the termination of the welding operation the welding current is cut off. Therefore when the electrode moves down through its return stroke leaving the welded can body on the mandrel, it does this without any arcing or burning. The welded can body is then removed in any suitable manner. This completes the welding cycle.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of electric butt-welding the full length simultaneously of complementary edges of thin metallic sheet material such as the side seam edges of can bodies, which comprises forming in said material corrugations disposed adjacent to and extending longitudinally of the edges to be welded, bringing the edges into abutting relation along their full length, clamping the material to hold the edges in abutting relation and against separation, exerting a pressure on said corrugations in a lateral direction to flatten them thereby forcing the abutting edges together under a high pressure and in a transverse edgewise direction, closely covering said abutting edges, and passing an electric current through said material from one of said abutting edges to the other and across the seam to be welded to heat said edges to a welding temperature for fusing and welding the edges together.

2. A method of electric butt-welding the full length simultaneously of complementary edges of thin metallic sheet material such as the side seam edges of can bodies, which comprises forming in said material corrugations disposed adjacent to and extending longitudinally of the edges to be welded, bringing the edges into abutting relation along their full length, temporarily clamping the material in position to retain the edges in firm abutting relation, exerting a pressure on said corrugations in a lateral direction to flatten them thereby forcing the abutting edges together under a high pressure and in a transverse edgewise direction, closely covering said abutting edges, unclamping the material during continuation of the application of pressure on said corrugations, and passing an electric current through said material from one of said abutting edges to the other and across the seam to be welded to heat said covered edges to a welding temperature for fusing and welding the edges together.

3. A method of electric butt-welding the full length simultaneously of complementary edges of thin metallic sheet material such as the side seam edges of can bodies, which comprises forming in said material corrugations disposed adjacent to and extending longitudinally of the edges to be welded, bringing the edges into abutting relation along their full length, clamping the material to hold the edges in abutting relation and against separation, exerting a pressure on said corrugations in a lateral direction to flatten them and to press the abutting edges together under high pressure and in a transverse edgewise direction, closely covering said abutting edges throughout their full length, passing an electric current through said material from one of said abutting edges to the other and across the seam to be welded to heat said edges to a welding temperature for fusing and welding the edges together, and continuing the pressure on said corrugations during the welding of the edges.

4. A method of electric butt-welding the full length simultaneously of complementary edges of thin metallic sheet material such as the side seam edges of can bodies, which comprises forming in said material corrugations disposed adjacent to and extending longitudinally of the edges to be welded, bringing the edges into abutting relation along their full length, clamping the material to hold the edges in abutting relation and against separation, exerting a pressure on said corrugations in a lateral direction to flatten them and to firmly press the abutting edges together edgewise, progressively increasing the pressure on said corrugations in a lateral direction to set up a progressively increasing high pressure in a transverse edgewise direction, closely covering both sides of said abutting edges, and passing an electric current through said material from one of said abutting edges to the other and across the seam to be welded to heat said edges to a welding temperature for fusing and welding them together.

5. A method of electric butt-welding the full length simultaneously of complementary edges of thin metallic sheet material such as the side seam edges of can bodies, which comprises forming in said material corrugations disposed adjacent to and extending longitudinally of the edges to be welded, bringing the edges into abutting relation along their full length, clamping the material to hold the edges in abutting relation and against separation, completely covering and confining both sides of said edges along their full length, and exerting a pressure on said corrugations from opposite sides while simultaneously heating said abutting edges to a welding temperature, the compression of said corrugations forcing the edges toward each other in a transverse edgewise direction and under high pressure to unite the edges in a welded seam.

6. A method of electric butt-welding the full length simultaneously of complementary edges of thin metallic sheet material such as the side seam edges of can bodies, which comprises forming in said material a corrugation adjacent and substantially parallel to an edge to be welded, bringing said edges into abutting engagement, clamping the material to hold the edges in abutting relation and against separation, covering and closely confining both sides of said abutting edges with dielectric material, exerting pressure on opposite sides of said corrugation to flatten it and thereby force said abutting edges together with increased lateral pressure, and passing an electric current through said material from one of said covered abutting edges to the other and across the seam to be welded to heat said covered edges to a welding temperature for fusing and welding together said edges.

HORACE J. PAYNTER.

REFERENCES CITED

The following references are of record in the file of this patent:

UNITED STATES PATENTS

| Number | Name | Date |
|---|---|---|
| 1,101,447 | Jones | June 23, 1914 |
| 1,816,864 | Murray | Aug. 4, 1931 |
| 2,092,003 | Mitchell | Sept. 7, 1937 |
| 2,385,710 | Kershaw | Sept. 25, 1945 |